Feb. 14, 1928.
J. R. OISHEI ET AL
1,659,496
WINDSHIELD WIPER
Filed March 29, 1927
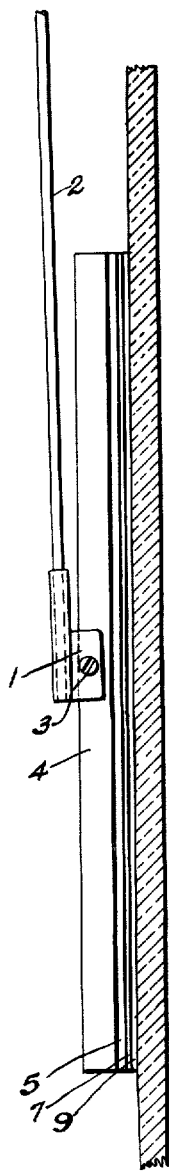
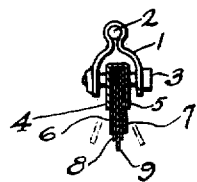
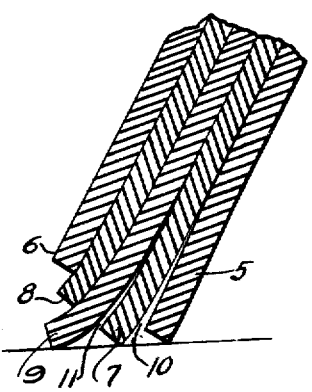
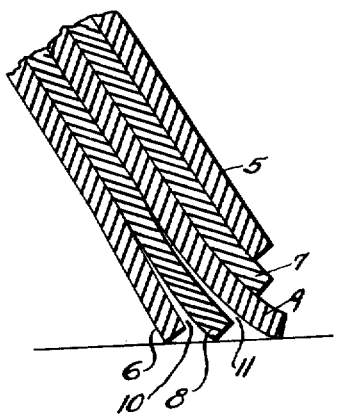
Inventors
John R. Oishei
Henry Hueber
Barton A. Bean Jr.
Atty.

Patented Feb. 14, 1928.

1,659,496

UNITED STATES PATENT OFFICE.

JOHN R. OISHEI AND HENRY HUEBER, OF BUFFALO, NEW YORK, ASSIGNORS TO TRICO PRODUCTS CORPORATION, OF BUFFALO, NEW YORK.

WINDSHIELD WIPER.

Application filed March 29, 1927. Serial No. 179,353.

This invention relates to the windshield cleaning art, and is more especially directed to an improved wiper for cleaning the moistened or coated surface of the windshield of a motor vehicle, whereby the driver will have a clear and unobstructed field of vision. The wiper element of windshield cleaners, both of the automatic as well as the manual type of cleaner usually consists of a strip of rubber suitably clamped within a metal backing strip. In practice the rubber wiper strips have been of varying thicknesses, from a thick and relatively heavy strip to a more or less frail and non-self-sustaining strip, and the free edge of this strip is relied upon for obtaining a clean wiping contact with the windshield glass.

In the manufacture of these wipers it frequently happens that the glass engaging edge of the rubber wiping strip becomes warped, or by improper placement of the rubber in its holder the projecting wiping edge will not be true throughout, so that a true wiping contact of the rubber with the windshield glass can not be obtained. If sufficient pressure is brought to bear on the wiper strip to obtain a good cleaning contact the latter is soon bent out of shape and thereby rendered useless.

The present invention has for its objects to provide a wiper element with a plurality of wiping edges; to provide a multi-edged wiper in which the edges have progressively increased contact with the glass in a direction away from the leading or foremost wiping edge; to provide a wiper of a multi-ply or multi-layer formation in which the several plies or layers are independently flexible and yieldable; to provide a multi-ply wiper in which the several plies project an increasingly greater distance from the outermost plies toward the center ply; to provide a wiper consisting of a plurality of independently flexible and contacting layers in relatively stepped or graduated relation with the outermost layers being the shortest, thereby providing a wiper having outwardly converging wiper faces which are adapted to be alternately brought into wiping contact with the windshield glass, and whereby each wiping face will be composed of a series of independently flexible edges between which, during operative contact with the windshield will be created channels for collecting moisture and by which the moisture may escape from the lower end of the wiper, which channels at the end of the corresponding operative strokes will be closed to expel and exclude the collected moisture.

In the drawings,

Fig. 1 is a side elevation of the improved wiper in untensioned contact with the glass of a windshield.

Fig. 2 is a cross sectional view thereof indicating by dotted showing the rockable mounting of the wiper.

Figs. 3 and 4 are enlarged detailed sectional views depicting the wiper in operation on its two reciprocatory strokes.

Referring in detail to the accompanying drawings, the numeral 1 designates a holder which is carried on the lower or free end of the wiping arm 2, which arm may be operated manually or automatically as desired, although the improved wiper is especially adapted to the automatically operated windshield cleaners wherein it is desired to obtain a perfect cleaning action without unduly burdening the cleaner motor by reason of excessive tension or pressure of the wiper against the windshield glass. The holder 1 is of substantially U-shaped formation and has two side flanges spaced sufficiently far apart to enable a rocking of the wiper element therebetween, the wiper element being suitably secured between said flanges by means of a bolt or screw 3 which pierces said flanges and the included wiper in such a manner that the latter will have a loose and relatively free mounting so that the wiper may rock back and forth as it is reciprocated over the windshield glass.

In accordance with the present invention the wiper comprises a wiper holding channel or backing strip 4, with the channel opening toward the windshield and multi-ply body consisting of a series or plurality of wiper strips of rubber, the rubber being thin and readily flexible but of sufficient thickness to render the plies or wiper strips self-sustaining. In the disclosure the outermost wiper strips or plies 5 and 6 are substantially of equal width but narrower than the remaining plies, and the adjacent plies 7 and 8 are substantially of equal width one to the other but are of greater width than the outermost plies 5 and 6, and of narrower width than the major wiper strip or central ply 9. While the wiper is shown as embodying five plies, it is not the intention to confine the scope of the invention to that particular number, since obviously a different number may be embodied in a wiper constructed in accordance with the spirit of the invention. These multi-plies or layers are secured in their stepped relation by clamping or impinging the side walls of the backing strip 4 against them. Obviously the layers could be of equal width and secured in the backing strip in stepped or graduated relation by stepping their inclosed edges inversely.

By reason of the rockable or loose mounting of the wiper in the holder 1 the series of layers on one side of the central strip or layer 9 together with the latter, will be active or have wiping contact with the windshield glass in one direction of movement, and the layers or plies on the other side of the central layer 9 together with the latter will have a like contact with the windshield glass when the wiper is moved in the opposite direction across the glass. The major wiper strip 9 is assisted by the relatively advanced and combined glass-wiping, liquid-gathering and discharging narrower strips 5, or 6, and 7, or 8. It can thus be said that the wiper is provided with two wiping surfaces or faces, one face comprising the outer edges of layers 5, 7 and 9 and the other wiping face consisting of the outer edges of layers 6, 8 and 9 and that these wiping faces normally converge outwardly toward the central layer 9. Each wiping face consists of a composite structure in which the individual or component parts are independently flexible and adapted to be spaced during their operative movement. By reason of their arrangement and flexible nature the three layers of each face will contact with the windshield glass, the leading or outermost layer 5, or 6, having a light contact with the glass to remove the bulk of the moisture; the next succeeding edge 7, or 8, will have an increased wiping contact or pressure with the windshield glass so as to remove substantially the remainder of the moisture; while the center layer which is of greatest width, and which preferably projects to a greater relative extent, will have a still greater contact with the glass or will be under a still greater pressure so as to practically dry the glass surface which has previously been wiped by the two preceding layers. By reason of the progressively increased pressures brought to bear on the two layers following the outermost or forwardmost layer, a recess or channel will be provided between the adjacent layers of each wiping face. Thus a recess or channel 10 is formed between the wiping layers 6 and 8, and a recess or channel 11 is formed between wiping layers 8 and 9, which channels provide a way of escape from any moisture collected by the succeeding wiping edge. By reason of the shape of the channels the moisture will quickly flow thereinto more or less through capillary attraction and should there be an excessive amount of moisture so collected it will readily find its escape through the lower end of the wiper. Then when the wiper reaches the end of its stroke and rocks over to the companion wiping face, the channels 10 and 11 will be collapsed or closed together so as to expel or squeeze out the collected moisture for discharge at the bottom of the wiper. This expulsion occurs at the end of the stroke and to one side of the field of vision. By reason of their arrangement the several layers will lend a reinforcement to each other; the leading or foremost layer 6 which has the lightest contact with the glass having a light reinforcement from the succeeding layer 8 at the top of the channel 10 and the layer 8 receiving a greater reinforcement from the layer 9 because of its heavier contact with the glass. The widest layer 9 is given a sustaining reinforcement by the two idle layers 5 and 7 and it will be noted that this is a graduated reinforcement, occurring at progressively higher points or at points progressively greater distances from the wiping edge of the layer 9. This provision provides for the gradual bending of the widest layer 9 without causing any sharp and injurious bending thereof.

We claim:—

1. A windshield cleaner for mounting on the windshields of motor vehicles, comprising a multi-ply wiper adapted to be mounted on a wiper arm whereby the wiper may flop over about its composite wiping edge at the beginning of each stroke of the arm for dragging behind the arm at an incline to the windshield glass, said multi-ply wiper comprising a holder and a plurality of flexible plies projecting unequal distances from the holder, said plies consisting of a major ply with a rubbing edge in constant engagement with the windshield glass and a minor ply on each side of the major ply having a rubbing edge spaced a shorter distance from the holder than said major ply rubbing edge for alternately contacting with the glass on one stroke in co-action with said major ply rubbing edge and lifting from the glass on the return stroke for reinforcing said constantly engaged major strip during its return wiping stroke, said minor plies acting in alternation with each other.

2. A wiper for windshield cleaners comprising a holder member adapted to secure a plurality of flexible wiping strips, said holder member having a part for attachment to a movable windshield cleaner arm adapted to be actuated in movements substantially parallel to the windshield glass including cooperating parts on said arm and holder whereby on the movement of the arm in one direction, the holder member is disposed at an inclination to the face of the windshield glass and on the movement of the arm in the opposite direction, the holder member is inclined in the opposite direction to said face of the windshield glass, a plurality of flexible wiping strips in said holder including a major strip having a rubbing edge adapted to contact with the face of the windshield glass in movements of the arm and holder in both directions on the windshield glass, and minor strips on opposite sides of said major strip, the rubbing edges of said minor strips projecting shorter distances than the edge of said major strip from the holder toward the windshield glass whereby the minor strips at one side of the major strip in movement of the holder in one direction on the windshield glass engage the windshield glass in wiping contact at different inclinations to the windshield glass than said major strip and provide therebetween moisture-receiving channels and in movement of the holder in the opposite direction on the windshield glass close the moisture-receiving channels and reinforce said major strip without substantial contact with said glass, the minor strips on the other side of said major strip performing the wiping function together with said major strip during said last-named movement.

JOHN R. OISHEI.
HENRY HUEBER.

whereby on the movement of the arm in one direction, the holder member is disposed at an inclination to the face of the windshield glass and on the movement of the arm in the opposite direction, the holder member is inclined in the opposite direction to said face of the windshield glass, a plurality of flexible wiping strips in said holder including a major strip having a rubbing edge adapted to contact with the face of the windshield glass in movements of the arm and holder in both directions on the windshield glass, and minor strips on opposite sides of said major strip, the rubbing edges of said minor strips projecting shorter distances than the edge of said major strip from the holder toward the windshield glass whereby the minor strips at one side of the major strip in movement of the holder in one direction on the windshield glass engage the windshield glass in wiping contact at different inclinations to the windshield glass than said major strip and provide therebetween moisture-receiving channels and in movement of the holder in the opposite direction on the windshield glass close the moisture-receiving channels and reinforce said major strip without substantial contact with said glass, the minor strips on the other side of said major strip performing the wiping function together with said major strip during said last-named movement.

JOHN R. OISHEI.
HENRY HUEBER.

CERTIFICATE OF CORRECTION.

Patent No. 1,659,496.  Granted February 14, 1928, to

JOHN R. OISHEI ET AL.

It is hereby certified that error appears in the printed specification of the above numbered patent requiring correction as follows: Page 2, line 65, for the word "from" read "for"; and that the said Letters Patent should be read with this correction therein that the same may conform to the record of the case in the Patent Office.

Signed and sealed this 6th day of March, A. D. 1928.

Seal.

M. J. Moore,
Acting Commissioner of Patents.

CERTIFICATE OF CORRECTION.

Patent No. 1,659,496. Granted February 14, 1928, to

JOHN R. OISHEI ET AL.

It is hereby certified that error appears in the printed specification of the above numbered patent requiring correction as follows: Page 2, line 65, for the word "from" read "for"; and that the said Letters Patent should be read with this correction therein that the same may conform to the record of the case in the Patent Office.

Signed and sealed this 6th day of March, A. D. 1928.

Seal.

M. J. Moore,
Acting Commissioner of Patents.